United States Patent
Robbins et al.

(10) Patent No.: US 9,528,567 B2
(45) Date of Patent: Dec. 27, 2016

(54) METHOD AND APPARATUS FOR AN ADAPTIVE SUSPENSION SUPPORT SYSTEM

(71) Applicant: ZERO SHOCK SEATING, LLC, Chandler, AZ (US)

(72) Inventors: Jody G. Robbins, Fountain Hills, AZ (US); William E. Woodbury, II, Mesa, AZ (US)

(73) Assignee: Zero Shock Seating, LLC, Chandler, AZ (US)

( * ) Notice: Subject to any disclaimer, the term of this patent is extended or adjusted under 35 U.S.C. 154(b) by 97 days.

(21) Appl. No.: 13/907,945

(22) Filed: Jun. 2, 2013

(65) Prior Publication Data

US 2013/0264455 A1    Oct. 10, 2013

Related U.S. Application Data

(63) Continuation-in-part of application No. 13/854,102, filed on Mar. 31, 2013, now abandoned, which is a
(Continued)

(51) Int. Cl.
| | |
|---|---|
| *F16M 11/24* | (2006.01) |
| *B60G 17/015* | (2006.01) |
| *F41A 23/00* | (2006.01) |
| *F16F 15/02* | (2006.01) |
| *B60N 2/50* | (2006.01) |

(Continued)

(52) U.S. Cl.
CPC .......... *F16F 15/022* (2013.01); *B60G 17/015* (2013.01); *B60N 2/501* (2013.01); *B60N 2/502* (2013.01); *B60N 2/508* (2013.01); *B62D 33/0608* (2013.01); *F16M 11/24* (2013.01); *F41A 23/00* (2013.01); *B60G 17/052* (2013.01); *B60G 17/08* (2013.01); *B60G 2500/10* (2013.01);
(Continued)

(58) Field of Classification Search
CPC ... B60C 17/052; B60C 17/08; B62D 33/0608; B60N 2/501; B60N 2/52; F16M 15/02
USPC ....... 248/550, 562, 564, 580, 636, 638, 584, 248/648; 280/5.514, 47.34, 6.151, 6.159; 180/65.1, 167; 296/190.07
See application file for complete search history.

(56) References Cited

U.S. PATENT DOCUMENTS

| | | | | |
|---|---|---|---|---|
| 3,578,278 | A | * | 5/1971 | Pickering ............ F16F 15/0275 248/550 |
| 7,611,157 | B2 | * | 11/2009 | Robbins ................... G06F 1/16 280/47.34 |

(Continued)

*Primary Examiner* — Tan Le
(74) *Attorney, Agent, or Firm* — The Noblitt Group, PLLC

(57) ABSTRACT

A method and apparatus for an adaptive, multi-axis suspension system providing both coarse and fine suspension for payloads such as passenger seats, trailers, passenger compartments of motor vehicles, shock/vibration generating devices etc. Coarse suspension control is provided to maintain the payload within a selected position regardless of the weight of the payload. Fine suspension control is provided by monitoring and analyzing vibration characteristics in time and/or frequency domains to determine a variable amount of damper resistance to be exerted by a magnetorheological (MR) device. A nominal damper resistance of the MR device is selected based at least on the combined weight of the payload. A piston of the MR device is centered about its throw range and the piston is actuated at angles not parallel to the movement of the payload to provide low-profile operation.

11 Claims, 6 Drawing Sheets

Related U.S. Application Data continuation of application No. 11/609,833, filed on Dec. 12, 2006, now Pat. No. 8,424,832, which is a continuation-in-part of application No. 11/278,642, filed on Apr. 4, 2006, now abandoned, application No. 13/907,945, which is a continuation-in-part of application No. 13/849,513, filed on Mar. 24, 2013, which is a continuation of application No. 12/620,510, filed on Nov. 17, 2009, now Pat. No. 8,424,885, which is a continuation-in-part of application No. 11/608,386, filed on Dec. 8, 2006, now Pat. No. 7,628,409, which is a continuation-in-part of application No. 11/317,414, filed on Dec. 22, 2005, now Pat. No. 7,461,849.

(60) Provisional application No. 60/669,225, filed on Apr. 6, 2005.

(51) Int. Cl.
*B62D 33/06* (2006.01)
*B60G 17/08* (2006.01)
*B60G 17/052* (2006.01)
*F16F 15/027* (2006.01)

(52) U.S. Cl.
CPC ...... *B60G 2500/20* (2013.01); *B62D 33/0604* (2013.01); *F16F 15/027* (2013.01)

(56) References Cited

U.S. PATENT DOCUMENTS

| | | | | |
|---|---|---|---|---|
| 8,424,832 | B2* | 4/2013 | Robbins | B60N 2/501 180/167 |
| 8,424,885 | B2* | 4/2013 | Woodbury, II | B62B 5/0026 280/47.34 |
| 2007/0151779 | A1* | 7/2007 | Robbins | G06F 1/16 180/65.1 |
| 2007/0152409 | A1* | 7/2007 | Robbins | B60G 7/008 280/5.514 |
| 2010/0110634 | A1* | 5/2010 | Woodbury, II | B62B 5/0026 361/698 |
| 2013/0264455 | A1* | 10/2013 | Robbins | F16F 15/022 248/564 |

* cited by examiner

METHOD AND APPARATUS FOR AN ADAPTIVE SUSPENSION SUPPORT SYSTEM

This application is a continuation-in-part of U.S. patent application Ser. No. 13/854,102, filed Mar. 31, 2013, which is a continuation of U.S. patent application Ser. No. 11/609,833, filed Dec. 12, 2006, which is a continuation-in-part of U.S. patent application Ser. No. 11/278,642, filed Apr. 4, 2006, which claims the benefit of U.S. Provisional Patent Application No. 60/669,225, filed Apr. 6, 2005, the contents of which are incorporated herein by reference in their entirety. This application is a continuation-in-part of U.S. patent application Ser. No. 13/849,513, filed Mar. 24, 2013, which is a continuation of application Ser. No. 12/620,510, filed Nov. 17, 2009, which is a continuation-in-part of application Ser. No. 11/608,386, filed Dec. 8, 2006, which is a continuation-in-part of application Ser. No. 11/317,414, filed Dec. 22, 2005, the contents of which are incorporated herein by reference in their entirety.

FIELD OF THE INVENTION

The present invention generally relates to suspension support systems, and more particularly to semi-adaptive suspension support systems.

BACKGROUND

Since the advent of the wheel, mobility has permeated most aspects of life. From the animal drawn buggies and carts of yesteryear, to today's most sophisticated transportation vehicles, literally hundreds of millions of people have come to depend on mobility in their everyday lives. Mobility, for example, provides faster, more efficient modes of operation, thus creating more productive work related activities and more enjoyable recreational activities.

While the wheel remains as one of the most widely used mechanisms to facilitate today's transportation means, other transportation facilitation mechanisms, such as aerodynamic lift and jet propulsion, have also emerged. Generally speaking, all modes of transportation are derived from a need to transport a payload from one point to another. The payload to be transported may represent animate objects, such as human beings, or inanimate objects, such as electronic equipment, volatile/explosive materials, commercial goods, etc.

In most instances, therefore, it is advantageous to reduce the amount of kinetic energy that is transferred to the payload, no matter what the payload may be. Substantial elimination of the transfer of road vibration to passengers in a motor vehicle, for example, may serve to minimize discomfort and/or injury, such as back pain, that may be caused by the road vibration. Furthermore, such a reduction may also serve to increase the passengers' endurance during long road trips, while preserving energy once the destination has been reached.

Reduction in the amount of kinetic energy that is transferred to the vibration sensitive payloads during transport remains as a high priority design criteria for virtually every mode of transportation. Current kinetic energy absorption solutions, however, tend to be largely ineffective, due in part to the inadequate level of shock absorption provided. Other kinetic energy absorption solutions may only offer a static level of kinetic energy absorption and are, therefore, incapable of adapting shock absorption to a changing environment.

In a mobile environment, however, a substantial portion of the acceleration forces exerted on the payload are time varying acceleration forces, which renders the static kinetic energy absorption solutions largely ineffective. Efforts continue, therefore, to enhance shock absorption performance for virtually any payload and for virtually any type of mobile environment.

SUMMARY

To overcome limitations in the prior art, and to overcome other limitations that will become apparent upon reading and understanding the present specification, various embodiments of the present invention disclose an apparatus and method of providing an adaptive suspension support system. The adaptive suspension support system may be implemented in virtually any environment to substantially isolate a payload from kinetic energy transfer and/or to isolate a carrier from a shock/vibration generating payload.

In accordance with one embodiment of the invention, an adaptive suspension support system comprises a payload, at least one damper having a damper resistance based, at least in part, on information indicative of a weight of the payload, a gear drive coupled to a piston of the at least one damper and the payload, where the piston is actuated along a directional vector that is different than a directional vector of movement of the payload and at least one pneumatic device coupled to the payload and operable to maintain a position of the piston between a minimum and a maximum throw position.

In accordance with another embodiment of the invention, an adaptive suspension support system comprises a frame having movable couplings, a payload platform movably coupled to the frame via the movable couplings, where the payload platform is operable to support a weight of a payload, at least one damper having a damper resistance based, at least in part, on information indicative of the weight, a gear drive coupled to a piston of the at least one damper and the payload platform, where the piston is actuated along a directional vector that is different than a directional vector of movement of the payload platform and at least one pneumatic device coupled to the payload platform and operable to maintain a position of the piston between a minimum and a maximum throw position.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
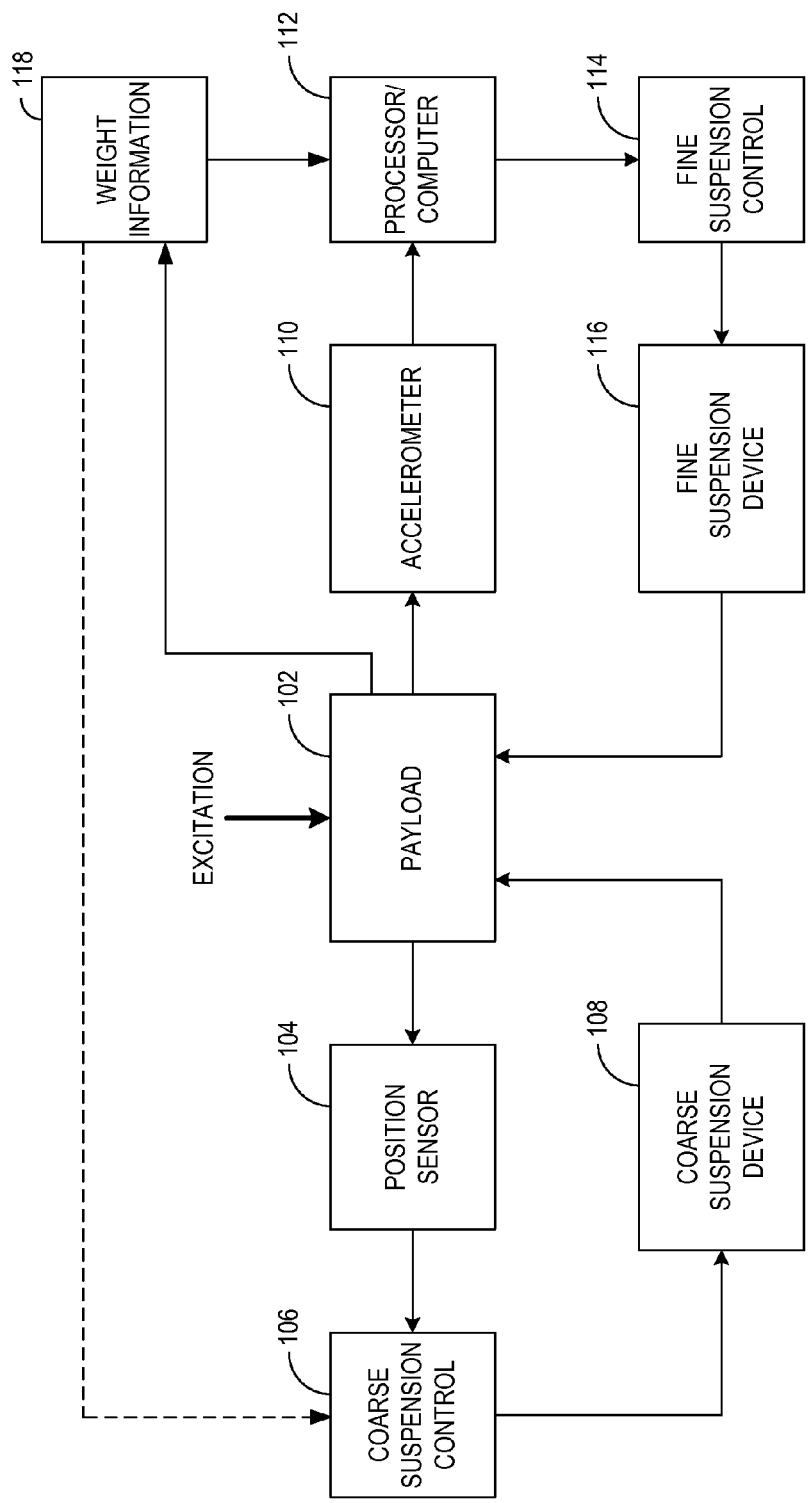
FIG. 1 illustrates an exemplary functional block diagram of an adaptive suspension support system.

Generally, the various embodiments of the present invention are applied to the protection of a payload in a mobile environment and/or to the protection of a carrier from its shock/vibration generating payload. Protection from kinetic energy transfer may be provided to assorted payloads in varying embodiments, whereby adaptive, multi-axis suspension may be implemented to protect the payload from potentially destructive acceleration forces. Protection from kinetic energy transfer may be provided to assorted carriers in varying embodiments, whereby adaptive, multi-axis suspension may be implemented to protect a carrier from potentially destructive acceleration forces being generated by a payload.

The multi-axis suspension system generally provides various modes of adaptability. In a first mode of adaptability, the multi-axis suspension system may provide weight adaptation, such that a dynamic weight opposition force may be applied to maintain an equilibrium position of the payload. Thus, regardless of the weight of the payload, the equilibrium position of the payload may nevertheless be substantially maintained between a range of available positions.

Weight adaptation may also be implemented to implement an optimal damper resistance of a damping device. For example, once a static weight of the payload is known (e.g., measured), a quiescent damper resistance based upon the static weight of the payload may be implemented. As the force applied by the weight of the payload changes (e.g., as positive or negative gravitational forces are exerted on the payload), the quiescent damper resistance of the damping device may be adapted based upon the changing force of weight being applied by the payload.

In a second mode of adaptability, the multi-axis suspension system may provide acceleration adaptation, whereby a damper force may be dynamically adjusted in response to varying acceleration forces that may be imposed upon the payload. Adaptive components associated with the multi-axis suspension support system may include one or more accelerometers to monitor the acceleration forces. The multi-axis suspension support system may further include one or more processing modules that may be used to analyze the detected acceleration forces to determine the proper mode of reactionary control necessary to optimally dampen the detected acceleration forces.

The multi-axis suspension support system may, for example, be encapsulated within a single suspension platform, that when combined with a payload platform, may suspend a payload such that the payload "floats" along a substantially vertical axis with respect to a reference position. Alternately, for example, the multi-axis suspension support system may, for example, be encapsulated within multiple suspension platforms to suspend a payload above a reference position with multiple degrees of freedom. For example, multiple suspension platforms may suspend a payload such that the payload "floats" above a reference position and each suspension platform may be independently controlled, not only to reduce shock and vibration that may be transferred to the payload, but also to control and absorb longitudinal axis variations (e.g., roll variations), lateral axis variations (e.g., pitch variations) and vertical axis variations (e.g., yaw variations) that may be acting on the payload.

In a first embodiment, the adaptive suspension support system may be used to isolate passengers in a moving vehicle from potentially harmful kinetic energy transfer during vehicular motion. In particular, seats occupied by each passenger may be equipped with the adaptive suspension support system, such that kinetic energy that would otherwise be transferred to the passengers, may instead be adaptively absorbed/damped. Thus, by effectively shock mounting the passenger seats using a adaptive suspension support system, the passengers may be substantially protected from varying acceleration forces that may be transferred to them as a result of vehicle movement.

A suspension platform may be adapted for use with virtually any vehicular application (e.g., car, boat, truck, airplane, all-terrain vehicle, helicopter) in use today. The suspension platform may, for example, include pre-drilled mounting hardware that may allow the suspension platform to be retrofitted to a particular application. For example, an existing seat in virtually any existing vehicle may be removed from its mounting foundation, a suspension platform may then be installed to the mounting foundation and the seat may then be mounted directly to the suspension platform. In such an embodiment, for example, the suspension platform may provide pre-drilled mounting configurations that may be compatible with both the mounting foundation of the vehicle as well as the mounting configuration of the seat.

In an alternate embodiment, a suspension platform may be retrofitted within the interior of the seat. In such an embodiment, for example, no additional height is required to accommodate the suspension platform, since the suspension platform may fit substantially within the existing height profile of the seat.

In yet another embodiment, a suspension platform may be retrofitted between a passenger compartment (e.g., a passenger cab of a semi-tractor truck) and the frame of a vehicle. In such an embodiment, the suspension platform may absorb/dampen shock and vibration that would otherwise be transferred from the frame of the vehicle to the passenger compartment that is mounted to the frame of the vehicle. In addition, suspension platforms may be retrofitted within each seat of the passenger platform to further reduce shock and vibration that may otherwise be transferred to the occupants of the vehicle.

In yet another embodiment, a suspension platform may be retrofitted to a trailer, such that the suspension platform may exist between the payload platform of the trailer and the frame upon which the payload platform is mounted. In such an embodiment, the suspension platform may provide suspension control substantially along a vertical axis, or conversely may provide multi-axis control, such that the trailer's payload may be manipulated in multiple dimensions. Accordingly, not only may shock and vibration be absorbed/damped, but adaptive components of the suspension platform may reposition one or more portions of the payload platform so as to alter a center of gravity (CG) of the trailer. In so doing, for example, stability may be added (e.g., a reduction in the tendency of the trailer to jackknife or tip over may be realized). Such a suspension platform may also be useful to redistribute the weight associated with a payload within airborne vehicles, so that control (e.g., adaptive control) of the CG of the aircraft may be adapted for safer flight (e.g., a CG of the aircraft may be adaptively repositioned toward the front of the aircraft and away from the rear of the aircraft to help prevent an unrecoverable stall configuration).

In other embodiments, suspension platforms may reduce shock/vibration that may otherwise be transferred to a carrier (e.g., a vehicle) by its shock/vibration producing payload. For example, a suspension platform may be installed between a mount for a portable firearm (e.g., a submachine gun, a machine gun or an automatic cannon) and an associated mounting foundation. Accordingly, for example, forces exerted by the portable firearm onto the mounting foundation may be absorbed/damped to reduce the forces that may otherwise be exerted onto the vehicle (e.g., helicopter) that the portable firearm may be mounted within. In such an instance, an increase in the stability of the vehicle may be realized while the portable firearm is being fired. Suspension components may also be used to absorb/dampen recoil from the portable firearm, so as to provide greater control and accuracy to the operator of the portable firearm.

In each of the embodiments discussed above, a multimode, adaptive suspension support system may be utilized. In a first mode of suspension control, coarse suspension control may be provided to effect a weight bearing support, whereby the magnitude of support that is provided may be adapted to the combined weight of the protected payload. For example, as a passenger is seated within an automobile seat, the coarse suspension control may adapt to the weight of the passenger by increasing the amount of opposing force that is necessary to maintain the position of the seat and the newly seated passenger within a coarse position range. Conversely, as a different passenger is seated within the seat, the coarse suspension control may adapt by automatically modifying the amount of opposing force that may be necessary to maintain the position of the seat and the newly seated passenger within the coarse position range.

In a second mode of suspension control, fine suspension control may be provided through a varying damper force, which may oppose movement and may seek to maintain a position of the payload within a fine position range. In a first embodiment, the damper force may be adaptive, such that the magnitude of the damper force may be set in response to a feedback control signal from, for example, a micro-electro mechanical system (MEMS) accelerometer measurement device. As such, the damper force may be adaptively increased in response to accelerometer feedback indicating a need for increased damper resistance. Conversely, the damper force may be adaptively decreased in response to accelerometer feedback indicating a need for decreased damper resistance.

Accelerometer feedback adaptation may be augmented through the use of processing modules that continuously monitor the accelerometer feedback signal. In such an instance, for example, signal processing may be employed to analyze both the time domain and frequency domain components of the accelerometer feedback signal in order to more accurately characterize the nature of the acceleration forces in real time. In addition, accelerometer feedback adaptation may further utilize weight information relative to the payload to establish a nominal damper resistance that may be proportional to the weight of the payload for optimized performance.

Components of the suspension platform may be arranged in a low-profile configuration, so as to minimize an amount of space that is occupied by the suspension platform. For example, a fine suspension control component (e.g., a shock absorber) may be mounted to the payload platform at an angle (e.g., horizontal with respect to the payload platform) via a mechanism (e.g., a right-angle gear drive). The right-angle gear drive may translate forces along one axis (e.g., a vertical axis) into forces along a different axis (e.g., a horizontal axis) such that the shock absorber may absorb/ dampen the vertical forces while being actuated along a horizontal axis via the right-angle gear drive. Accordingly, for example, a height profile of the suspension platform may be reduced by allowing the fine suspension control component to be mounted in a space saving fashion (e.g., horizontally) as well as allowing the fine suspension control component to be actuated in a space saving fashion (e.g., horizontally).

Turning to FIG. 1, an exemplary functional block diagram of an adaptive suspension support system is illustrated. Payload 102 may be representative of animate, or inanimate, objects that may be subjected to varying acceleration forces, or excitations, as may be experienced in a mobile environment, such as in a motor vehicle or airplane. As discussed above, multiple modes of adaptive suspension may be implemented to substantially eliminate kinetic energy transfer to payload 102.

In a first mode of adaptive suspension, coarse suspension control may be effected to provide weight support to payload 102. In particular, a position of payload 102 may be detected by measuring the displacement of payload 102 along a directional axis, e.g., in a vertical direction. In a first embodiment, position sensor 104 may implement sensors (e.g., magnetic sensors) that may detect position excursions of payload 102 relative to an equilibrium position of payload 102.

In response to the detected position excursion, coarse suspension control 106 and coarse suspension device 108 may combine to return payload 102 to its equilibrium position. In a first embodiment, coarse suspension device 108 may include a coiled energy spring having a variable spring constant, k. In such an instance, payload 102 may exhibit a substantially fixed weight, whereby a substantially fixed amount of deflection below the equilibrium position of payload 102 may be detected by position sensor 104. As such, coarse suspension control 106 may effect an increase in the spring constant, k, in response to the detected payload position, such that the position of payload 102 may return to its equilibrium position due to the increased spring constant.

In an alternative embodiment, coarse suspension device 108 may be implemented as a pneumatically controlled device, such as an air bladder, air piston, or a pneumatically controlled lift. Accordingly, coarse suspension control 106 may include an air compressor, or another source of compressed air, which may either inflate or deflate coarse suspension device 108 in response to a position control feedback signal emitted by position sensor 104. In such an instance, weight adaptation may be implemented to maintain payload 102 within a substantially fixed position range irrespective of the weight of payload 102.

In response to an excursion of payload 102 below its equilibrium position, for example, coarse suspension control 106 may cause a counteracting correction of coarse suspension device 108. By virtue of the mechanical coupling between payload 102 and coarse suspension device 108, the position of payload 102 may then be raised. In response to an excursion of payload 102 above its equilibrium position, on the other hand, coarse suspension control 106 may cause a counteracting correction of coarse suspension device 108. By virtue of the mechanical coupling between payload 102 and coarse suspension device 108, the position of payload 102 may then be lowered.

In a second mode of adaptive suspension, fine suspension control may be effected to dampen kinetic energy transfer to payload 102. Accelerometer 110 may be implemented to detect, and subsequently provide, an acceleration feedback control signal that is indicative of the time-varying attributes of acceleration excitations being applied to payload 102. Processor/computer 112 may then continually analyze the acceleration feedback control signal to determine the nature of the acceleration forces being applied.

For example, processor/computer 112 may apply a fast Fourier transform (FFT) to the acceleration feedback control signal to determine the spectral content of vibration that is generated by the acceleration excitations. As such, fine suspension control 114 and fine suspension device 116 may be adapted through the FFT analysis of processor/computer 112 to provide wide vibration bandwidth isolation to payload 102.

Harmonic components of vibration may also be analyzed to determine the time varying characteristics of the vibration. In particular, the power spectra of the vibration may be analyzed using the FFT algorithm to determine signal strength in designated frequency bands (e.g., FFT bins) of the FFT output. A quantitative relationship between the vibration amplitude in the time domain and the associated spectral amplitude in the frequency domain may then be obtained to optimize the kinetic energy absorption performance of fine suspension device 116.

For example, if the power spectra of the vibration is confined to relatively few FFT bins, then the acceleration excitation may be characterized as a steady state excitation having a sinusoidal property centered about a substantially constant frequency. As such, fine suspension device 116 may be optimized to dampen vibration at the steady state excitation frequency by appropriate control of its damper force via fine suspension control 114.

If the power spectra of the vibration is not confined to a relatively few FFT bins, but is rather spread across multiple FFT bins, then the acceleration excitation may instead be characterized as a step change in payload 102 displacement, such as may be caused by driving over a pothole or speed bump. In such an instance, the damper force of fine suspension device 116 may be optimized by fine suspension control 114 for optimum damper force at fundamental and harmonic frequencies of vibration excitation. Once the vibration impulse is dampened, fine suspension control 114 may return fine suspension device 116 to a mode of operation as may be dictated by the acceleration feedback control signal.

In addition, processor/computer 112 may continuously process FFT data to achieve a quiescent mode of operation, whereby optimized kinetic energy absorption across a wide bandwidth of vibration excitation may be further facilitated. That is to say, for example, that averaging of the FFT data may yield an optimized suspension control signal from fine suspension control 114, such that the damper force of fine suspension device 116 may be maintained at a nominal level between the steady state response and the step change response as discussed above.

Optimized suspension control in one embodiment means, for example, that the reaction time of fine suspension device 116 is minimized due to the quiescent mode of operation. In particular, since fine suspension device 116 may be programmed to exhibit a nominal damper force, the reaction time to achieve minimum or maximum damper resistance is essentially cut in half, assuming that the nominal damper force selected represents an average damper force across the entire dynamic range of damper force of fine suspension device 116.

In addition, weight information 118 that is received by processor/computer 112 from a manually programmed signal and/or from some other weight sensing device (e.g., an automatic weight sensor) that is indicative of the weight of payload 102 may also be used to program the nominal damper resistance. In particular, performance of fine suspension device 116 may be optimized by selecting a nominal damper resistance that may be proportional to the weight of payload 102 as indicated by weight information 118. Weight information 118 may also be supplied to coarse suspension control 106, so that an equilibrium position of payload 102 may be maintained by coarse suspension device 108 in response to a signal from position sensor 104 and/or weight information 118.

In one embodiment, fine suspension device 116 may be implemented as a magnetorheological (MR) device, which may incorporate MR fluid whose viscosity may be changed in the presence of a magnetic field. As such, a viscosity change in the MR fluid may be effected by the presence of a magnetic field to increase/decrease the damper force of fine suspension device 116.

In particular, fine suspension control 114 may transmit a pulse width modulated (PWM) signal to a conductive coil (not shown) that surrounds the MR fluid contained within a monotube housing of the MR device. The PWM signal parameters, such as duty cycle, may be modified in response to the analysis performed by processor/computer 112 to adjust the damper force of fine suspension device 116. Thus, fine suspension control 114 is said to be adaptive, since the control signal parameters to the MR device are modified in response to the analysis performed by processor/computer 112.

Adaptive fine suspension control may be distinguished from static suspension control as may be provided, for example, by a rheostat. Rheostats, for example, often employ a control knob, which may allow parameters of a control signal (e.g., a pulse width of a PWM modulated signal) that is provided to the MR device to be statically programmed in response to the knob position. After that, the parameters of the control signal remain static and do not change regardless of the analysis performed by an accelerometer and/or a processor/computing element.

Thus, a static control system may only be responsive to the control knob setting of the rheostat. It can be seen, therefore, that adaptive fine suspension control may improve upon statically controlled fine suspension systems in a mobile environment, since acceleration forces may be time varying, thus potentially requiring a dynamically controlled damper resistance. Accordingly, by retrofitting a static control mechanism with an adaptive fine suspension control, improvements to the static control system may be realized.

Weight information 118 may, for example, be set via a rheostat to enhance the performance of fine suspension device 116 and/or coarse suspension control 106. In particular, the weight of payload 102 may be reflected via the weight information signal emitted by the rheostat, whereby the weight information signal emitted by the rheostat is proportional to the weight of payload 102. Alternately, weight information 118 may be provided by a weight sensing device that may automatically and continuously measure a weight of payload 102 and provide the weight information to processor/computer 112 and/or coarse suspension control 106.

By increasing the duty cycle of the PWM signal in response to an adaptive control signal, fine suspension control 114 may impart an increased magnitude of time varying current to the coil of an MR device, which in turn may impart an increased magnetic field around the MR fluid of the MR device. In response, the damper forces exerted by fine suspension device 116 may increase proportionally to react to dynamically changing acceleration forces. Conversely, by decreasing the duty cycle of the PWM signal in response to the adaptive control signal, fine suspension control 114 may impart a decreased magnitude of time varying current to the coil of an MR device, which in turn may impart a decreased magnetic field around the MR fluid of the MR device. In response, the damper forces exerted by fine suspension device 116 may decrease proportionally in response to the adaptive control signal.

If weight information 118 is utilized by processor/computer 112, then fine suspension control 114 may command fine suspension device 116 to a nominal damper resistance that may be proportional to the weight of payload 102 as indicated by weight information 118. In particular, fine suspension control 114 may set the duty cycle of the PWM signal, at least in partial response to weight information 118, to impart a magnitude of time varying current to the coil that may be proportional to at least the weight of payload 102. As such, the nominal damper resistance of fine suspension device 116 may be set at least in partial response to the weight of payload 102.

Figure 2:
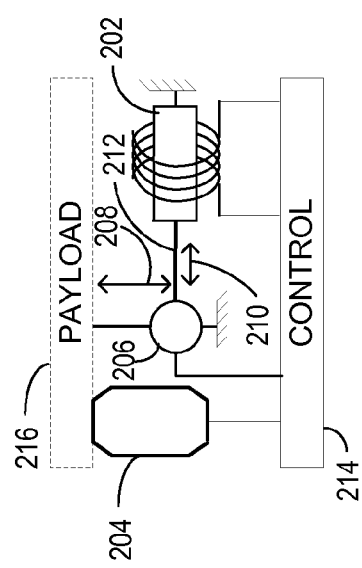
FIG. 2 illustrates an exemplary schematic diagram of an adaptive suspension module.

Turning to FIG. 2, an adaptive suspension support system is exemplified. In particular, a low-profile adaptive suspension support system is exemplified that may be used in suspension platforms that may be tailored for applications where space along a particular axis (e.g., a vertical axis) may be conserved.

Payload 216 may exemplify a component of any number of adaptive suspension support applications (e.g., a passenger seat of a vehicle, a passenger compartment of a vehicle, or a payload of a trailer) whereby shock and vibration are absorbed/damped to minimize shock and vibration transfer to payload 216. The vertical position of payload 216 may be adjusted through actuation of one or more coarse suspension control devices 204 (e.g., via control 214), which in one embodiment may be implemented as pneumatically controlled devices. Control 214 may include compressors, position sensors, weight information devices and the like, such that the commanded position of payload 216 may be maintained through appropriate actuation of the one or more pneumatically controlled devices 204.

Acting in conjunction with the one or more pneumatically controlled devices 204 are one or more fine suspension control devices 202, which in one embodiment, may be implemented as MR suspension devices, to provide fine suspension along directional vector 208. MR suspension devices 202 may be mounted in a space-saving fashion (e.g., horizontally as shown) and may be actuated in a space-saving fashion (e.g., horizontally as shown), such that movement of payload 216 along directional vector 208 may result in actuation of piston 212 along directional vector 210 via operation of device 206.

In one embodiment, device 206 may be a right-angle gear drive that may translate movement of payload 216 along directional vector 208 into movement of piston 212 along directional vector 210. It should be noted that virtually any angle between 0 degrees and 90 degrees (i.e., orthogonal) may be accommodated by device 206, such that any deflection of payload 216 along directional vector 208 may be translated into a movement of piston 212 that is between 0 degrees and 180 degrees with respect to directional vector 208.

It should also be noted, that device 206 may provide varying gear ratios that may augment operation of device 202. For example, a gear ratio of device 206 may be provided such that movement along directional vector 208 may be translated into a movement of piston 212 that is in proportion to the gear ratio of device 206. Accordingly, for example, the throw of piston 212 along directional vector 210 may be less than, equal to, or greater than the proportionate deflection of payload 216 along directional vector 208 due to the gear ratio as provided by device 206. In addition, a clutch device (not shown) may be actuated by control 214 such that a multitude of gear ratios may be adaptively selected within device 206 as may be required by a particular application.

Coarse suspension devices 204 may maintain an equilibrium position of payload 216 such that a position of piston 212 may be substantially centered between a minimum and a maximum throw position of piston 212. Accordingly, since coarse suspension device 204 may substantially center the throw of piston 212, the mechanical coupling between payload 216 and MR suspension device 202 may be optimized throughout the entire movement range of payload 216 so as to substantially avoid the end-stop limits of piston 212 (e.g., piston 212 may be substantially prevented from reaching its maximum or minimum extension limits).

Control 214, for example, may include an accelerometer (e.g., accelerometer 110 of FIG. 1), a weight information device, position sensors (e.g., position sensor 104 of FIG. 1), a computer (e.g., processor/computer block 112 of FIG. 1), fine suspension control (e.g., fine suspension control 114 of FIG. 1), coarse suspension control (e.g., coarse suspension control 106 of FIG. 1) and the like to adaptively minimize an amount of kinetic energy that may be transferred to payload 216. An accelerometer (e.g., accelerometer 110 of FIG. 1) may be implemented to detect, and subsequently provide, an acceleration feedback control signal that is indicative of the time-varying attributes of acceleration excitations being applied to payload 216.

A computer (e.g., processor/computer 112 of FIG. 1) may then continually analyze the acceleration feedback control signal to determine the nature of the acceleration forces being applied. Control 214 may then provide an appropriate control signal to MR suspension device 202 in response to the analysis performed. Control 214 may similarly provide an appropriate control signal to MR suspension device 202 to maintain a nominal magnitude of MR damper resistance that is in proportion to the weight of payload 216. Weight information may be provided by control 214 via a static control (e.g., a rheostat), or via automatic control (e.g., a weight sensing device). Control 214 may also provide an appropriate control signal to coarse suspension device 204 to, for example, center payload 216 within an optimal throw position of piston 212. Control 214 may also provide an appropriate control signal to device 206 to automatically change a gear ratio as provided by device 206.

Figure 3:
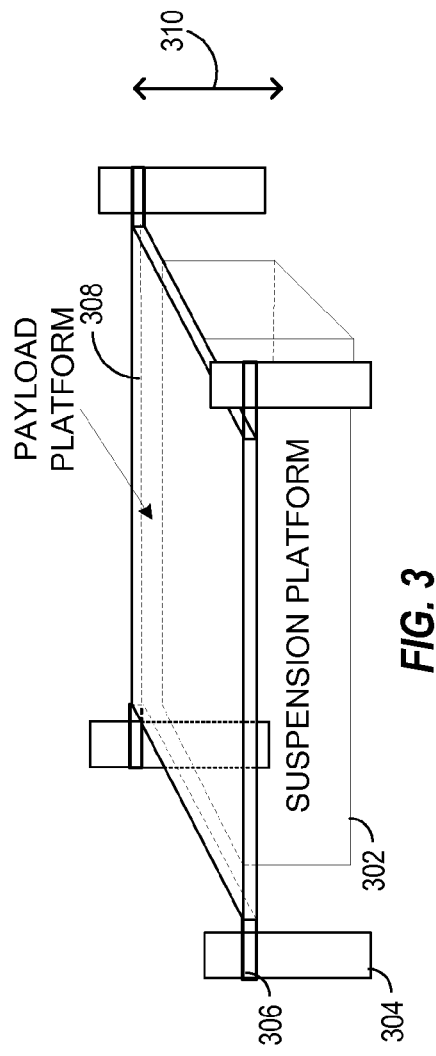
FIG. 3 illustrates an embodiment of an adaptive suspension support system.

Turning to FIG. 3, a payload (not shown) may be mechanically supported by payload platform 308 and a plurality of movable couplings 306 (e.g., one movable coupling located at each corner of payload platform 308) having linear bearings, such that the payload may be supported by suspension platform 302. The linear bearings of movable couplings 306 track vertically along outer frame 304 to maintain the payload in a laterally fixed relationship with respect to outer frame 304. The laterally fixed relationship being maintained while the payload moves along directional vector 310 while shock and vibration forces are being absorbed/damped by suspension platform 302.

Suspension platform 302 may adjust the vertical position of the payload (not shown), as supported by payload platform 308. Accordingly, inflating pneumatically controlled devices of suspension platform 302 (e.g., one or more coarse suspension devices 204 of FIG. 2) may cause the payload to track upward along directional vector 310, whereby the lateral relationship with respect to outer frame 304 is maintained by movable couplings 306. Conversely, deflating pneumatically controlled devices of suspension platform 302 (e.g., one or more coarse suspension devices 204 of FIG. 2) may cause the payload to track downward along directional vector 310, whereby the lateral relationship with respect to outer frame 304 is maintained by movable couplings 306.

Figure 4:
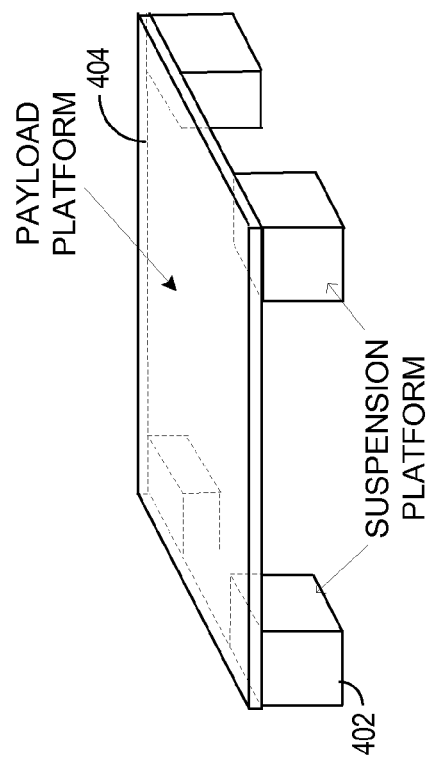
FIG. 4 illustrates an alternate embodiment of an adaptive suspension support system.

Turning to FIG. 4, a plurality of suspension platforms 402 may be positioned under payload platform 404 (e.g., a suspension platform 402 located under each corner of payload platform 404). Each suspension platform 402 may include adaptive suspension components (e.g., the adaptive suspension support components of FIG. 2), such that each suspension platform 402 may independently absorb/dampen/control position variations of payload platform 404 and the payload (not shown) being supported by payload platform 404.

Accordingly, for example, payload platform 404 and associated payload (not shown) may be subjected to control inputs provided by suspension platforms 402 such that longitudinal, lateral and/or vertical forces that may be acting upon payload platform 404 and associated payload may be absorbed/damped. In so doing, suspension platforms 402 may act independently to invoke roll, pitch, and yaw control inputs to payload platform 404 that may be effective not only to control a three-dimensional displacement of payload platform 404 and associated payload, but also to damp/absorb vibration and shock excitation that may be imposed upon the payload along the longitudinal, lateral and/or vertical axes relative to the payload.

Figure 5:
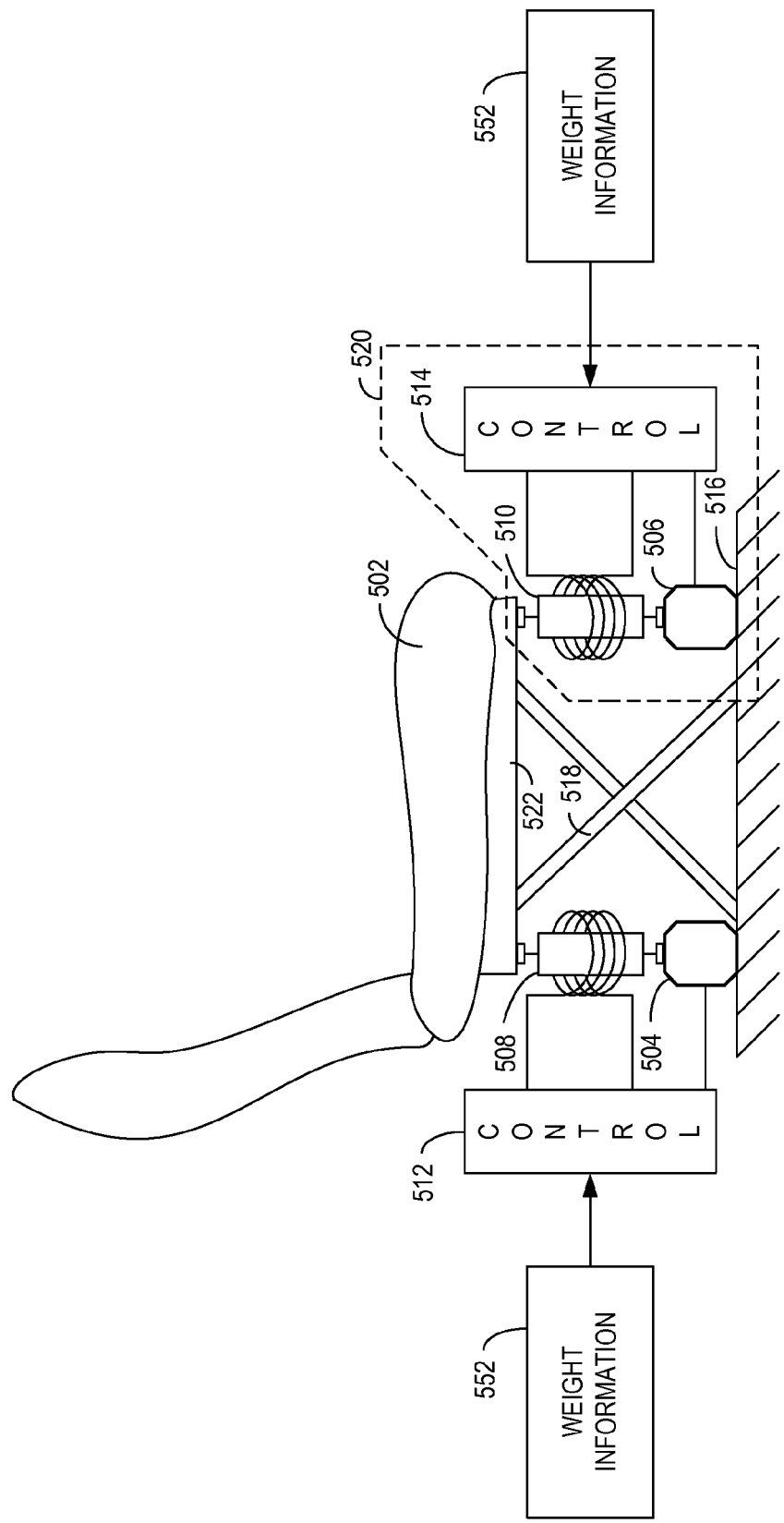
FIG. 5 illustrates an application of an adaptive suspension support system.

Turning to FIG. 5, an alternate embodiment of an adaptive suspension support system is exemplified, in which the payload may represent passenger seat 502, as well as the passenger (not shown), within a vehicle or airborne transport mechanism. As illustrated, one or more suspension platforms 520 (e.g., four suspension platforms 520) may be combined with other support systems, such as support structure 518, for added programmability of the commanded position of seat 502, as discussed in more detail below. It should be noted, that suspension devices 504-510 may be installed vertically as illustrated, or conversely, may be angled as necessary to facilitate a given implementation. Furthermore, any placement of suspension devices 504-510 (e.g., device pairs 504/508 and 506/510 placed in parallel with each other, respectively, or device pairs 504/508 and 506/510 placed in series with each other, respectively) along seat frame 522 and platform 516 may be implemented as required to facilitate a given implementation.

The vertical position of seat 502 may be adjusted through actuation of coarse suspension control devices 504 and/or 506, which in a first embodiment, may be implemented using coiled energy springs having either fixed, or variable, spring constants, k, and in a second embodiment, may be implemented using pneumatically controlled devices. Control blocks 512 and/or 514 may include compressors, position sensors and the like, such that the commanded position of seat 502 may be maintained through appropriate actuation of pneumatically controlled devices 504 and/or 506 irregardless of the weight of passenger seat 402 and passenger (not shown).

The commanded position of passenger seat 502 may be substantially horizontal to platform 516 by maintaining coarse suspension control devices 504 and 506 at substantially the same inflation level. Alternately, a slightly reclined position may be maintained, without sacrifice to kinetic energy absorption capability, by inflating coarse suspension control device 506 to a slightly higher level as compared to coarse suspension control device 504. It can be seen that a multitude of adjustment configurations (e.g., adjustment configurations along the longitudinal, vertical and lateral axes) may be enhanced using multiple suspension platforms 520 without suffering a loss of kinetic energy absorption capability.

Acting in conjunction with pneumatically controlled devices 504 and/or 506 are fine suspension control devices 508 and/or 510, which in one embodiment, may be implemented as MR suspension devices. Since MR suspension devices 508 and/or 510 maintain mechanical coupling with passenger seat 502 throughout the entire adjustment range of passenger seat 502, the operation of MR suspension devices 508 and/or 510 are unaffected by the adjustment of passenger seat 502. That is to say, for example, that MR suspension devices 508 and/or 510 may substantially eliminate kinetic energy transfer to passenger seat 502 (and associated passenger), irregardless of the configured position of passenger seat 502.

Control blocks 512 and/or 514, for example, may combine an accelerometer (e.g., accelerometer 110 of FIG. 1), a processor (e.g., processor/computer block 112 of FIG. 1), and fine suspension control (e.g., fine suspension control 114 of FIG. 1) to adaptively dampen kinetic energy transfer to passenger seat 502. Control 512 and/or 514 may be implemented to detect, and subsequently provide, an acceleration feedback control signal that is indicative of the time-varying attributes of acceleration excitations being applied to passenger seat 502.

Control 512 and/or 514 may then continually analyze the acceleration feedback control signal to determine the nature of the acceleration forces being applied. Control blocks 512 and/or 514 may then provide an appropriate control signal to MR suspension devices 508 and/or 510, respectively, in response to the analysis performed by control 512 and/or 514. Control blocks 512 and/or 514 may similarly provide an appropriate control signal to MR suspension devices 508 and/or 510, respectively, to maintain a nominal magnitude of MR damper resistance that is in proportion to the weight of passenger seat 502 (and associated passenger) as provided by weight information 552. As discussed above, weight information 452 may be provided by a manually programmed rheostat, a weight sensing device, etc.

Figure 6:
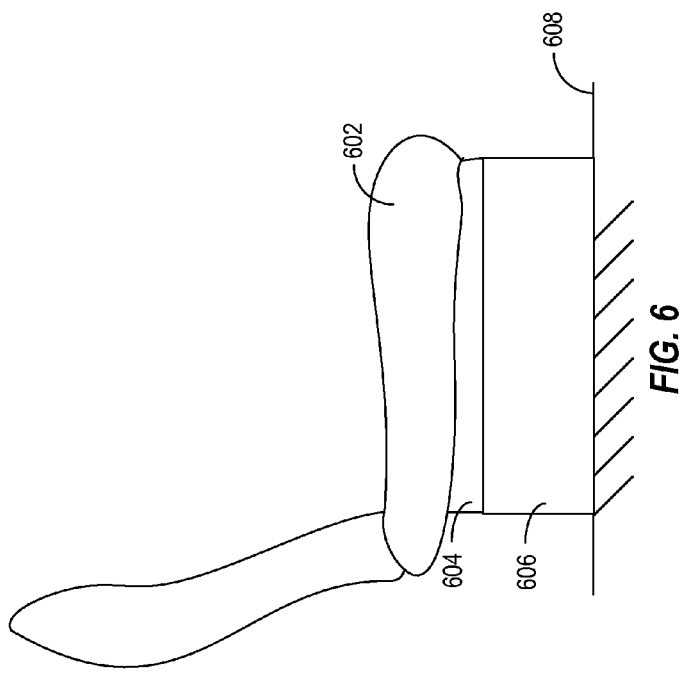
FIG. 6 illustrates an alternate application of an adaptive suspension support system.

Turning to FIG. 6, an alternate embodiment of an adaptive suspension support system is exemplified, in which one or more suspension platforms 606 may be retrofitted under an existing passenger seat of virtually any vehicle. Suspension platform 606 may, for example, be a single suspension platform (e.g., single suspension platform 302 of FIG. 3), or conversely, suspension platform 606 may be multiple suspension platforms (e.g., four suspension platforms 402 of FIG. 4 mounted at each corner of seat base 604).

Figure 7:
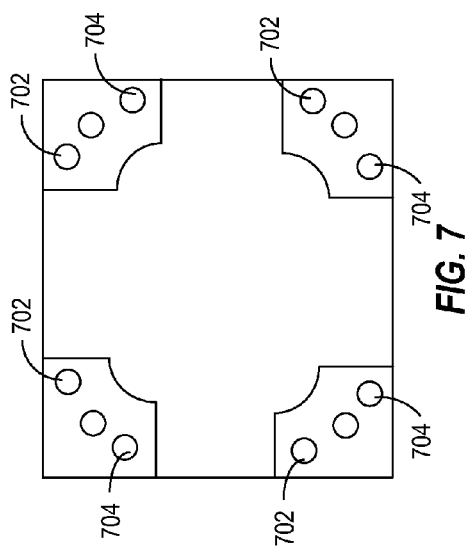
FIG. 7 illustrates components of an adaptive suspension support system.

Suspension platform 606 may, for example, include a universal mounting configuration (e.g., the mounting configuration of FIG. 7), such that the universal mounting configuration may be compatible with foundation 608 of virtually any vehicle. That is to say, for example, that mounting configuration 702 of a first side of suspension platform 606 may be compatible with the opposing mounting configuration arranged on platform 608 of a first make of a vehicle, mounting configuration 704 of the first side of suspension platform 606 may be compatible with the opposing mounting configuration arranged on platform 608 of a second make of a vehicle, and so on.

Figure 8:
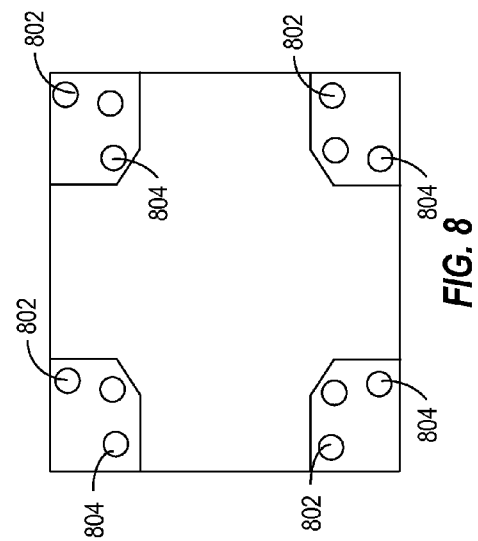
FIG. 8 illustrates components of an adaptive suspension support system.

Similarly, suspension platform 606 may, for example, include a universal mounting configuration (e.g., the mounting configuration of FIG. 8), such that the universal mounting configuration may be compatible with seat base 604 of virtually any vehicle seat. That is to say, for example, that mounting configuration 802 of a second side of suspension platform 606 may be compatible with the opposing mounting configuration arranged on seat base 604 of a first make of a vehicle seat, mounting configuration 804 of the second side of suspension platform 606 may be compatible with the opposing mounting configuration arranged on seat base 604 of a second make of a vehicle seat, and so on.

Figure 9:
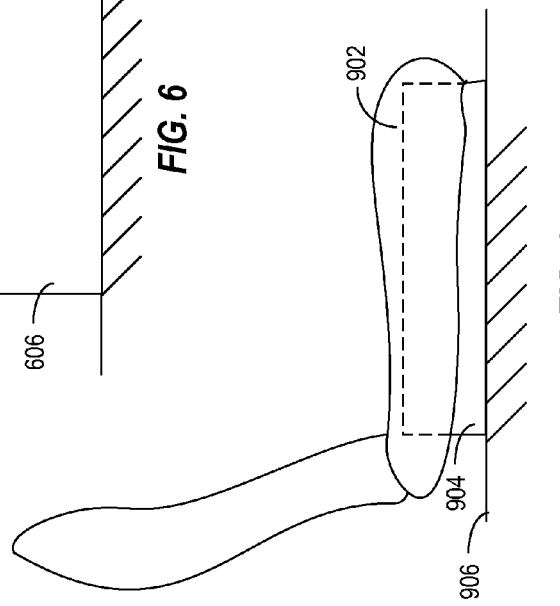
FIG. 9 illustrates an alternate application of an adaptive suspension support system.

Turning to FIG. 9, an alternate embodiment of an adaptive suspension support system is exemplified, in which one or more suspension platforms 904 may be retrofitted within the interior of an existing passenger seat of virtually any vehicle. Suspension platform 904 may, for example, be a single suspension platform (e.g., single suspension platform 302 of FIG. 3), or conversely, suspension platform 904 may be multiple suspension platforms (e.g., four suspension platforms 402 of FIG. 4 mounted at within each corner of seat 902).

Suspension platform 904 may be inserted substantially within an interior profile of seat 902, such that a distance (e.g., a vertical distance) between seat 902 and foundation 906 is minimized. Such an embodiment may be beneficial, for example, for those vehicle applications where space under seat 902 may be limited (e.g., under the seat of a Porsche 911).

Figure 10:
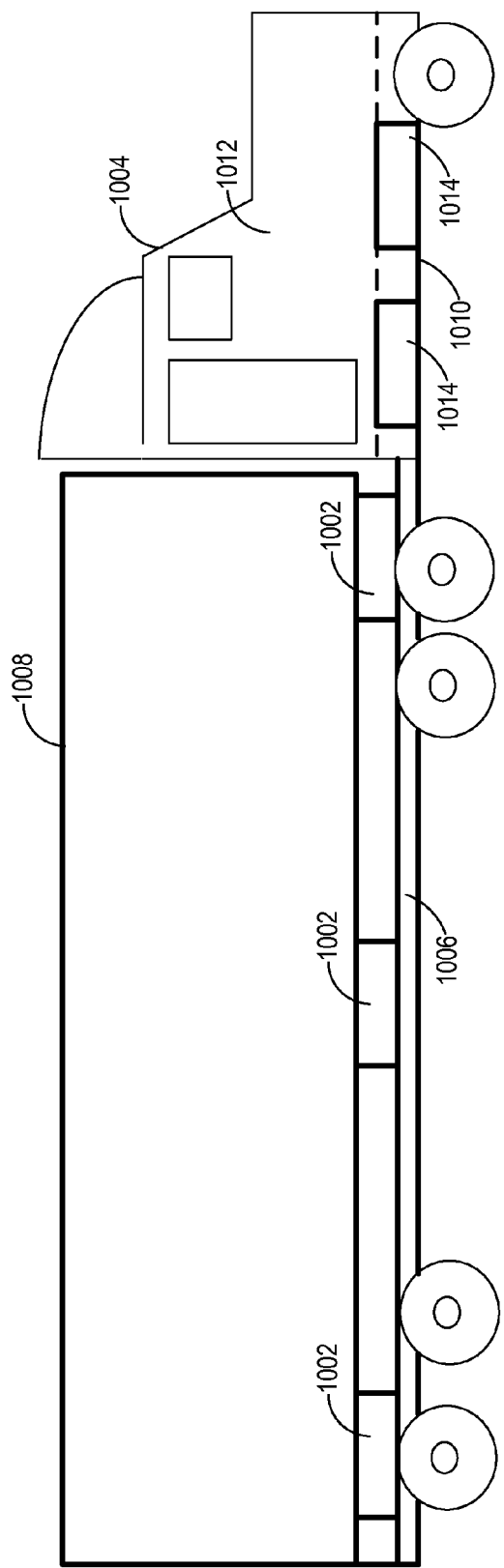
FIG. 10 illustrates an alternate application of an adaptive suspension support system.

Turning to FIG. 10, an alternate embodiment of an adaptive suspension support system is exemplified, in which one or more low-profile suspension platforms 1002 may be placed between frame 1006 and trailer 1008 to provide shock/vibration protection for cargo (not shown) contained within trailer 1008. Suspension platforms 1002 may, for example, include multiple low-profile suspension platforms (e.g., four suspension platforms 402 of FIG. 4 mounted at each corner between frame 1006 and trailer 1008 and a fifth suspension platform 402 of FIG. 4 mounted at a midpoint between frame 1006 and trailer 1008). The need for a portion of the pneumatic controls that may otherwise be associated with suspension platforms 1002 (e.g., air compressors) may, for example, be obviated by tapping into a source of compressed air that may already be available within the pneumatic systems of tractor 1004.

In addition to providing shock/vibration protection, suspension platforms 1002 may combine to provide a stability control mechanism. For example, a system of suspension platforms 1002 may operate to counteract dynamic forces that may cause trailer 1008 to become unstable (e.g., tip over due to a shifting weight of cargo contained within trailer 1008). For example, should a downward force be applied to one side of trailer 1008 (e.g., from a shifting cargo weight on that side of trailer 1008 caused by a tight turn), the adaptive pneumatic control associated with one or more of the suspension platforms 1002 on that side of trailer 1008 may first detect the increased weight and/or detect a downward shift in the displacement on that side of trailer 1008 and may operate to increase a ride height associated with that side of trailer 1008 to compensate for the downward shift. In addition, the pneumatic control associated with one or more of the suspension platforms 1002 on the opposite side of trailer 1008 may also detect a decreased weight and/or detect an upward shift in the displacement of the opposite side of trailer 1008 and may cause the ride height of the opposite side of trailer 1008 to decrease in order to compensate for the upward shift. As a result, the system of suspension platforms 1002 may interoperate to cause trailer 1008 to "push back" against, or oppose, the force that may otherwise cause trailer 1008 to become unstable (e.g., cause trailer 1008 to jackknife and/or tip over).

One or more suspension platforms 1014 may, for example, be placed between frame 1010 and cab 1012 of tractor 1004. Suspension platforms 1014 may, for example, include multiple low-profile suspension platforms (e.g., one or more suspension platforms 402 of FIG. 4 mounted between frame 1010 and cab 1012 of tractor 1004). The need for a portion of the pneumatic controls that may otherwise be associated with suspension platforms 1014 (e.g., air compressors) may, for example, be obviated by tapping into a source of compressed air that may already be available within the pneumatic systems of tractor 1004. Accordingly, shock/vibration that may otherwise be transferred from frame 1010 to cab 1012 may instead be substantially absorbed/damped by the one or more suspension platforms 1014.

In addition, the adaptive pneumatic control associated with suspension platforms 1014 may provide additional stability for cab 1012. Longitudinal stability (e.g., roll stability) may, for example, be provided whereby conditions (e.g., road conditions) that may cause the right or left portions of frame 1010 to raise or lower may be detected by the adaptive pneumatic control of suspension platforms 1014 to compensate by lowering or raising the right or left portions, respectively, of cab 1012. As a result, a tendency of frame 1010 to roll from side to side may be offset by establishing a counteracting roll of cab 1012 by suspension platforms 1014 to maintain cab 1012 substantially level along the longitudinal axis.

Similarly, lateral stability (e.g., pitch stability) may, for example, be provided whereby conditions (e.g., road conditions) that may cause the front or back portions of frame 1010 to raise or lower may be detected by the adaptive pneumatic control of suspension platforms 1014 to compensate by lowering or raising the front or back portions, respectively, of cab 1012. As a result, a tendency of frame 1010 to pitch fore or aft may be offset by establishing a counteracting pitch of cab 1012 by suspension platforms 1014 to maintain cab 1012 substantially level along the lateral axis. It should be noted that suspension platforms 1014 and associated functionality may be placed between the frame and passenger compartment of virtually any vehicle, such as a recreational vehicle, a car, a bus, a boat, an airplane and the like.

In an alternate embodiment, a suspension platform may, for example, include a single low-profile suspension platform (e.g., suspension platform 302 of FIG. 3 operable to support the full weight of trailer 1008 on payload platform 308). In such an instance, for example, trailer 1008 may rest upon a payload platform (e.g., payload platform 308) and may be supported by a suspension platform (e.g., suspension platform 302), while trailer 1008 may be allowed to "float" above frame 1006 via movable couplings (e.g., movable couplings 306) and the associated linear bearings (not shown) of the movable couplings. That is to say, in other words, that substantially all of the shock/vibration that may otherwise be transferred from frame 1006 to trailer 1008 may instead be absorbed/damped by the suspension platform (e.g., suspension platform 302) while trailer 1008 may be allowed to gently move in a substantially vertical direction (e.g., along directional vector 310).

Figure 11:
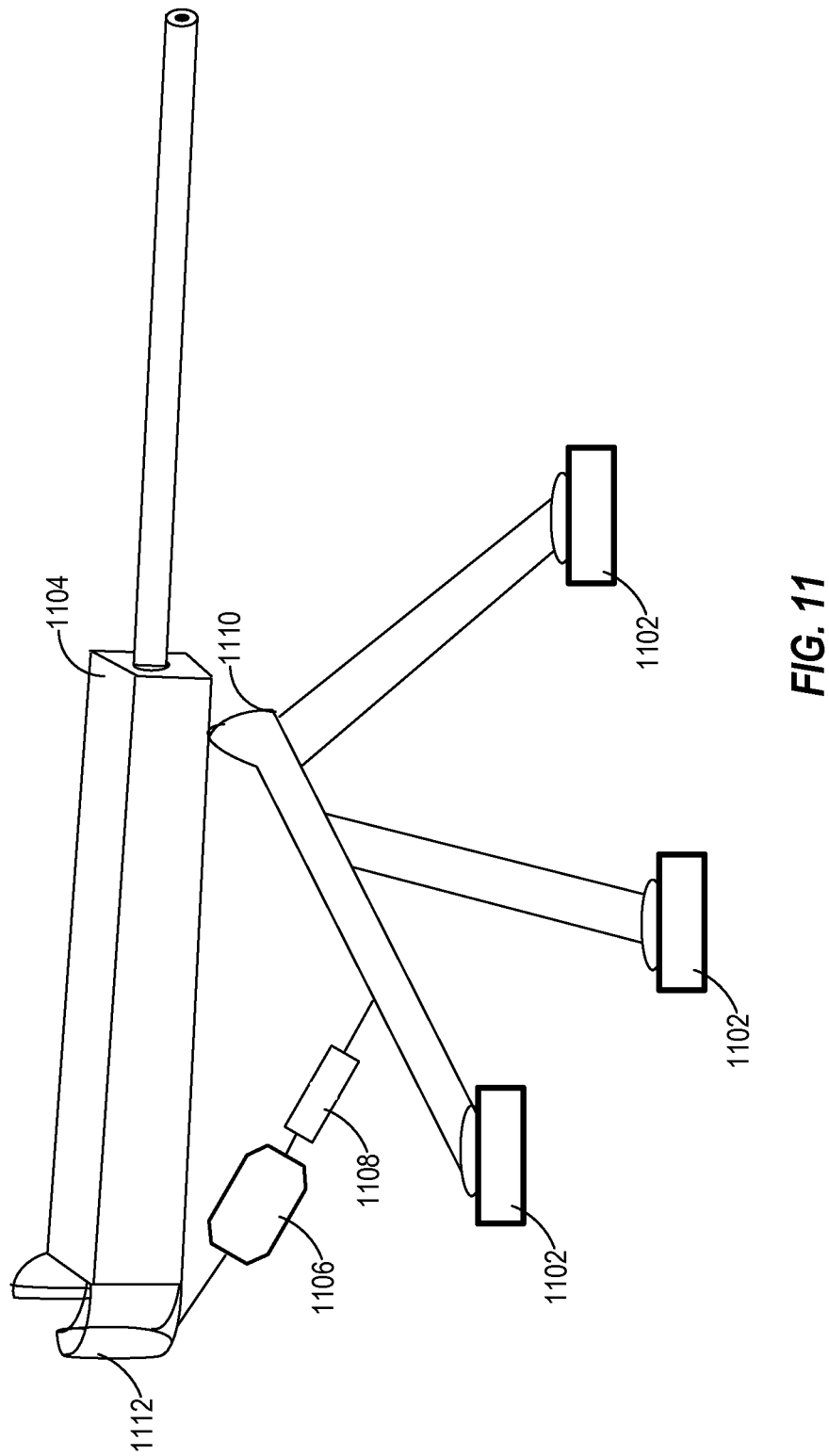
FIG. 11 illustrates an alternate application of an adaptive suspension support system.

Turning to FIG. 11, an alternate embodiment of an adaptive suspension support system is exemplified, in which one or more low-profile suspension platforms 1102 may be placed between a shock/generating device (e.g., machine gun 1104) and a mount (not shown) for machine gun 1104. Suspension platforms 1102 may, for example, include multiple low-profile suspension platforms (e.g., a suspension platform 402 of FIG. 4 mounted under each leg of tripod 1110) or a single suspension platform (e.g., suspension platform 302 where each leg of tripod 1110 is mounted to payload platform 308).

Suspension platform(s) 1102 may, for example, substantially isolate the mounting platform (e.g., a machine gun bay of a military helicopter) from the shock and vibration generated by machine gun 1104 as it is being fired from an aerial position afforded by the helicopter.

Accordingly, any recoil forces that may otherwise be imposed upon the helicopter by machine gun 1104 may instead be substantially absorbed/damped by suspension platform(s) 1102. As a result, greater stability may be afforded to the helicopter while machine gun 1104 is being fired from an aerial position, since a substantial portion of the recoil forces may be absorbed/damped by suspension platform(s) 1102 rather than being allowed to create an unstable condition for the helicopter (e.g., displace the helicopter from its flight path due to the recoil forces generated by machine gun 1104).

Additional shock/vibration isolation may be generated by component 1106 (e.g., a pneumatic device) and/or component 1108 (e.g., an MR device) along with the associated control components (not shown). In particular, any recoil forces generated by machine gun 1104 that may otherwise be transferred to the operator (not shown) of machine gun 1104 via handle 1112 may instead be absorbed/damped by components 1106 and/or 1108. As a result, greater accuracy of fire may be afforded due to a substantial portion of the recoil forces being absorbed/damped before they are allowed to affect aiming stability as facilitated by handle 1112.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. An adaptive suspension support system, comprising:
   a payload;
   at least one damper having a damper resistance based, at least in part, on information indicative of a weight of the payload;
   a gear drive coupled to a piston of the at least one damper and the payload, wherein the piston is actuated along a directional vector that is different than a directional vector of movement of the payload; and
   at least one pneumatic device coupled to the payload and operable to maintain a position of the piston between a minimum and a maximum throw position.

2. The suspension platform of claim 1, wherein the payload is a passenger seat.

3. The suspension platform of claim 1, wherein the payload is a trailer.

4. The suspension platform of claim 1, wherein the payload is a passenger compartment of a motor vehicle.

5. The suspension platform of claim 1, wherein the payload is a machine gun.

6. An adaptive suspension support system, comprising:
   a frame having movable couplings;
   a payload platform movably coupled to the frame via the movable couplings, the payload platform operable to support a weight of a payload;
   at least one damper having a damper resistance based, at least in part, on information indicative of the weight;
   a gear drive coupled to a piston of the at least one damper and the payload platform, wherein the piston is actuated along a directional vector that is different than a directional vector of movement of the payload platform; and
   at least one pneumatic device coupled to the payload platform and operable to maintain a position of the piston between a minimum and a maximum throw position.

7. The suspension device of claim 6, wherein the movable couplings include linear bearings.

8. The suspension platform of claim 6, wherein the payload is a passenger seat.

9. The suspension platform of claim 6, wherein the payload is a trailer.

10. The suspension platform of claim 6, wherein the payload is a passenger compartment of a motor vehicle.

11. The suspension platform of claim 6, wherein the payload is a machine gun.

* * * * *